Patented Sept. 14, 1926.

1,599,493

UNITED STATES PATENT OFFICE.

KARL FRIEDRICH SCHMIDT, OF HEIDELBERG, GERMANY, ASSIGNOR TO KNOLL & CO., OF LUDWIGSHAFEN-ON-THE-RHINE, GERMANY, A FIRM COMPOSED OF ALBERT KNOLL, HANS KNOLL, AND MAX DAEGE.

PRODUCTION OF TETRAZOLES.

No Drawing. Application filed December 11, 1925, Serial No. 74,884, and in Germany January 2, 1924.

In my prior application for Letters Patent Serial No. 28,962, filed May 8, 1925, which has matured into U. S. Patent No. 1,564,631, granted December 8, 1925, there is set forth a process for the production of derivatives of hypothetical imines including the amines and their substitution products by treating hydrocarbons, ketones, aldehydes and their derivatives with hydrazoic acid in the presence of concentrated mineral acids.

In this process the inter-reacting substances are united in molecular quantities. Thereby, the NH, resulting from the interaction of hydrazoic acid with the concentrated mineral acid, reacts with hydrocarbon derivatives, for example, ketones which are in normal manner transformed into for example, substituted acid amides.

The action of hydrazoic acid upon unsaturated compounds is indeed already known (see, for example, Chemisches Centralblatt, 1913, pages 2024 and 1915, II, page 596). In these reactions however the hydrazoic acid is attached as a whole. There are thus formed by the addition of $N_3H$ to unsaturated compounds, azides or their conversion products. These reactions are therefore characterized in that the resulting reaction products contain three more nitrogen atoms than the initial material.

The process set forth in my prior application provides a method for the direct introduction of amido groups into hydrocarbons or their derivatives. Prior to my invention set forth in the application referred to, the method employed usually comprised treating a nitro compound or a phenol compound whereby the characteristic groups of these compounds were changed or modified. According to the invention referred to, it became possible to introduce amido groups directly into numerous hydrocarbons and their derivatives by employing hydrazoic acid which is caused to decompose under the influence of mineral acids. The hydrazoic acid is decomposed into $N_2$ and the residue NH, attaches itself for example, to benzol with the formation of aniline.

If the action of the decomposing hydrazoic acid occurs upon organic compounds with double bonds (C=C, N=N, C=O), for example; aldehydes, ketones, unsaturated acids, ketone acids, the attaching of NH to the double bond occurs. With aldehydes, for example, nitrils or the formyl compounds of the respective amines are formed.

It has been found that by the action of an excess of hydrazoic acid on carbonyl compounds the reaction proceeds so that another molecule of $N_3H$ condenses with the above compounds forming tetrazoles, without splitting off $N_2$. The following formulæ show the reactions with cyclohexanone:

1. Without $N_3H$ excess:

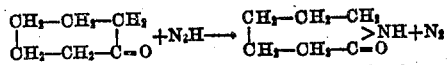

Cyclohexanone    Leucin lactam.

2. With excess of $N_3H$:

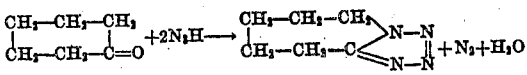

Pentamethylene tetrazol.

There is no relation between these compounds of $N_3H$ with carbonyl compounds and the hitherto known addition products of hydrazoic acid and nitrogen compounds such as acid, carbo-di-imide derivatives, as the starting material contains no nitrogen. Such carbodi-imide derivatives may be $$C_6H_5.N=C=N.C_6H_5$$

carbodiphenylimid and carboditolylimid $$CH_3.C_6H_4-N=C=N-C_6H_4.CH_3$$

(Berichte der deutschen Chem. Gesselshaft 55, 1289).

The addition of $N_3H$ to nitrogen-free substances can, of course, result only in azides or their derivatives (see Centralblatt 1915, II, 596) that is, substances containing three atoms of N.

If, however, the reaction is explained as a subsequent union of $N_3H$ with leucin lactam, it then has no connection with the hitherto known tetrazol synthesis, since it proceeds with splitting off of water. Nor is any case known wherein use is made of hydrazoic acid on acid amides or hypothetical intermediate products of the type

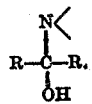

Example 1.

9.8 g. (1 mol.) cyclohexanone, while being cooled, is dropped into 11 g. (2½ mol.) of hydrazoic acid dissolved in benzol, ether, tetraline, etc., after the addition of a little acid. The yield of tetrazol compound is about 70%. Only ε-leucin lactam is obtained as a by-product.

Example 2.

15.7 g. acetone are slowly dropped, with constant stirring and ice cooling, into a mixture of 35 g. $N_3H$, dissolved in about 500 ccm. of benzol, and 50 ccm. concentrated $H_2SO_4$, 5000 ccm. of $N_2$ are thereby evolved. The acid stratum is then diluted with ice, neutralized with sodium carbonate and alcohol added to completely precipitate out the sodium sulfate. A saturated sublimate solution (that is a cold saturated aqueous solution of mercuric chloride, about 4% $HgCl_2$) is used to precipitate from the concentrated filtrate the difficultly soluble $HgCl_2$ molecule compound of the reaction product; melting point 111°.

The aqueous solution of this compound is then treated (decomposed) with hydrogen sulfide, the filtrate evaporated and the residue re-crystallized from ligroin. Melting point 71°. Reaction neutral. Analysis $C_3H_6N_4$. The substance is N–C dimethyl tetrazol.

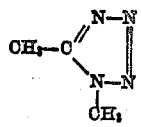

as the cleavage (splitting up) into N, $CO_2$ and 2 mol. methylamine shows. The yield is about 80% of the theoretical yield.

Example 3.

Operation as above, 6 g. $N_3H$, 5.5 g. benzophenone. 1.68 g. $N_2$ were split off. The acid stratum, on termination of the experiment, solidified to a crystalline mash, which re-crystallized from benzol and alcohol, melted at 163°. Yield—6 g.

The reaction probably takes place in the following manner:

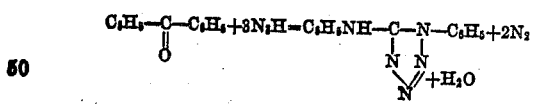

The product is identical with phenylimidophenyl tetrazolon (4 phenyltetrazolanil) which was produced by Busch and Bauer (Ber. 33, 1069) from amido diphenyl guanidin and nitrous acid.

Besides sulphuric acid I may employ any of the following catalysts: phosphorus pentoxide, zinc chloride, iron (ferric/ferrous) chloride, phosphorus pentachloride, phosphorus tri-chloride, phosphorus oxychloride $SnCl_2$, $SnCl_4$, $K_2SnCl_6$, $(NH_4)_2SnCl_6$, $SbCl_3$, $AlCl_3$, and their equivalents. Any catalyst of the type of zinc chloride and of the other catalyzers enumerated above may be used so long as they do not possess basic properties which will destroy the hydrazoic acid by neutralization. Besides inorganic catalysts, it has also been discovered that organic catalysts, such as sulphoacetic acid $SO_3H$-$CH_2$-$COOH$ and ethyl sulphuric acid may be used. A gaseous substance as gaseous hydrochloric acid may be used as a catalyzer in the place of sulphuric acid or the above catalyzers. When the above catalyzers are used instead of sulphuric acid they are added to the reaction mixture until the evolution of gas ceases.

Pentamethylene tetrazol is a white crystalline substance, melting point is 57–58° C., readily soluble in water and in usual organic solvents. Solution reacts neutral.

Pentamethylene tetrazol crystallizes out of benzol in white crystals. It is very resistant to chemical action. Splitting with strong hydrochloric acid by heating to at least 250° C. and yields hydrogen, carbon dioxid, and pentamethylene diamine. It combines with one molecule of $HgCl_2$ which is difficultly soluble in water and melts at 175° C.

By the expressions carbonyl compounds I intend to include aldehydes, ketones or their derivatives which have a carbonyl group or compounds which during the reaction will give rise to compounds containing a carbonyl group.

In place of acetone, cyclohexanone or benzophenone, I may use other carbonyl compounds, for example such as referred to in the above patent, namely, acetaldehyde and benzaldehyde.

I claim:—

1. The process for the production of tetrazoles characterized in that $N_3H$ is caused to act, in excess, on carbonyl compounds in the presence of concentrated mineral acid.

2. The process of producing tetrazoles comprising treating carbonyl compounds in the presence of concentrated mineral acid with an excess of hydrazoic acid.

3. The process of producing tetrazoles comprising treating carbonyl compounds in the presence of concentrated mineral acid with an excess of hydrazoic acid dissolved in a solvent thereof.

4. The process of producing tetrazoles comprising treating carbonyl compounds in the presence of concentrated mineral acid with an excess of hydrazoic acid, the mixture being kept cool during the reaction period.

5. The process of producing tetrazoles comprising treating carbonyl compounds in the presence of concentrated mineral acid with an excess of hydrazoic acid, and purifying the resulting tetrazol by recrystallization.

6. The process of treating organic compounds of the hydrocarbon type to directly introduce therein amine nitrogen comprising adding thereto an excess of hydrazoic acid in the presence of a catalyst.

7. The product pentamethylene tetrazol,

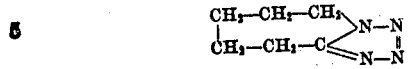

characterized by the following properties: crystallizes out of benzol in white crystals m. p. 57–58° C.; readily soluble in water and most organic solvents with neutral chemical reaction; very resistant to chemical action, splits with strong hydrochloric acid upon heating to at least 250° C. and yields hydrogen, carbon dioxid and pentamethylenediamin; and combines with one molecule $HgCl_2$ which is difficultly soluble in water and melts at 175°.

8. The process of producing tetrazols comprising treating carbonyl compounds with an excess of hydrazoic acid in the presence of a catalyst which will not neutralize the hydrazoic acid.

In testimony that I claim the foregoing as my invention, I have signed my name hereto.

KARL FRIEDRICH SCHMIDT.